United States Patent
Tian et al.

(10) Patent No.: US 8,331,609 B2
(45) Date of Patent: Dec. 11, 2012

(54) METHOD AND SYSTEM FOR TEMPORAL SYNCHRONIZATION

(75) Inventors: Jun Tian, Plainsboro, NJ (US); Jeffrey Adam Bloom, West Windsor, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 633 days.

(21) Appl. No.: 12/309,372

(22) PCT Filed: Dec. 8, 2006

(86) PCT No.: PCT/US2006/046815
§ 371 (c)(1),
(2), (4) Date: Jan. 19, 2010

(87) PCT Pub. No.: WO2008/010836
PCT Pub. Date: Jan. 24, 2008

(65) Prior Publication Data
US 2010/0303279 A1    Dec. 2, 2010

Related U.S. Application Data

(60) Provisional application No. 60/831,526, filed on Jul. 18, 2006.

(51) Int. Cl.
*G06K 9/00* (2006.01)
(52) U.S. Cl. ....................................................... 382/100
(58) Field of Classification Search .................. 382/100, 382/232–253; 380/200–242; 358/3.28, 426.01–426.16; 348/384.1–440.1; 375/122, 240.01–240.29
See application file for complete search history.

(56) References Cited

U.S. PATENT DOCUMENTS

| | | | |
|---|---|---|---|
| 6,571,361 | B1 | 5/2003 | Kikuchi et al. |
| 6,683,966 | B1 | 1/2004 | Tian et al. |
| 2001/0029580 | A1 | 10/2001 | Moskowitz |
| 2001/0040934 | A1 | 11/2001 | Shoji |

(Continued)

FOREIGN PATENT DOCUMENTS
JP    10-126389    5/1998
(Continued)

OTHER PUBLICATIONS

Sharma et al., "Watermark Synchronization: Perspectives and a New Paradigm," 40th Conference on Information Science and Systems, Mar. 22, 2006, pp. 1182-1187, XP002433004.

(Continued)

*Primary Examiner* — Atiba O Fitzpatrick
(74) *Attorney, Agent, or Firm* — Robert D. Shedd; Robert B. Levy; Jorge Tony Villabon

(57) ABSTRACT

Embodiments of the present invention provide a method, apparatus and system for temporal synchronization of digital content based on a marker symbol and a marker code. A marker symbol is inserted at an identifiable location of a payload (e.g., the beginning and/or end of a payload) at regular intervals in the digital content and the payload is marker coded to form a periodic sequence. The payload is marker coded such that the maker symbol is not repeated by the coded payload. The periodic sequence is then embedded into digital content. A decoder is able to re-synchronize the payload by determining the location of the marker symbol. As such, a method, apparatus and system is provided for robust temporal synchronization for, for example, content encoding and decoding for applications such as audio and video watermarking and the like.

18 Claims, 4 Drawing Sheets

U.S. PATENT DOCUMENTS

| | | |
|---|---|---|
| 2002/0164046 A1 | 11/2002 | Walker et al. |
| 2003/0099372 A1 | 5/2003 | Wendt |
| 2003/0103645 A1 | 6/2003 | Levy et al. |
| 2003/0221106 A1 | 11/2003 | Delp et al. |
| 2005/0219080 A1 | 10/2005 | Kalker et al. |
| 2006/0028689 A1 | 2/2006 | Perry et al. |
| 2006/0159262 A1 | 7/2006 | Guillemot et al. |

FOREIGN PATENT DOCUMENTS

| | | |
|---|---|---|
| JP | 2001-223684 | 8/2001 |
| JP | 2004-056806 | 2/2004 |
| JP | 2006-505207 | 2/2006 |

OTHER PUBLICATIONS

Jordan et al., "Geometric Attacks on Image Watermarking Systems," IEEE Multimedia, IEEE Service Center, New York, NY, US, vol. 12, No. 3, Jul. 2005, pp. 68-78, XP011137009.

Ratzer, "Marker Codes for Channels With Insertions and Deletions," 3rd International Symposium on Turbo Codes and Applications, 2003, pp. 1-4, XP002433005.

Sellers, "Bit Loss and Gain Correction Code," Institute of Radio Engineers Transactions on Information Theory USA, vol. IT-8, No. 1, Jan. 1962, pp. 35-38, XP002433003.

International Search Report, dated Jun. 1, 2007.

METHOD AND SYSTEM FOR TEMPORAL SYNCHRONIZATION

This application claims the benefit, under 35 U.S.C. §365 of International Application PCT/US2006/046815 filed Dec. 8, 2006, which was published in accordance with PCT Article 21(2) on Jan. 24, 2008 in English and which claims the benefit of United States provisional patent application Serial No. 60/831,526 filed Jul. 18, 2006.

FIELD OF THE INVENTION

The present invention generally relates to digital content security and, more particularly, to a method and system for temporal synchronization for encoding and decoding digital content.

BACKGROUND OF THE INVENTION

For the encoding and decoding of digital content, synchronization plays a vital role. For example, in a digital watermarking environment, synchronization (also called registration) is vital for payload decoding in applications such as watermarking. For audio and video watermarking, the synchronization typically takes the form of a temporal synchronization, though some video watermarking methods also require spatial synchronization. Common methods for watermark synchronization can be classified into four major categories:

[1] Geometrically invariant transform based, where the watermark is embedded in a signal transform domain that is invariant to specific geometric transformations.
[2] Recovery assisted methods, where a synchronization signal or an autocorrelation of a periodic watermark will be utilized for synchronization.
[3] Feature based, where the watermark is embedded into semantically meaningful features of the content.
[4] Exhaustive search, where the detection is running over all possible geometric distortions.

However, current synchronization schemes have noted deficiencies. For example, assume a payload, p, is an N-bits binary sequence $b\_0\ b\_1\ b\_2\ \ldots\ b\_\{N-1\}$, where $b\_i=0$ or $1$, for $0<=i<N$. Further assume that the payload, p, will be repeatedly embedded into the content as $b\_0\ b\_1\ b\_2\ \ldots\ b\_\{N-1\}\ b\_0\ b\_1\ b\_2\ \ldots\ b\_\{N-1\}\ \ldots\ b\_0\ b\_1\ b\_2\ \ldots\ b\_\{N-1\}$. During decoding, due to cropping, insertions, deletions and/or substitutions (collectively, IDS), etc., some payload bits might be lost, some might be incorrectly decoded, and some additional bits might be added. Thus the decoded sequence may look like $b\_3\ b\_4\ b\_6\ b\_7\ b\_8\ a\_0\ b\_9\ a\_1\ b\_11\ b\_12\ \ldots$, where in this example, $b\_0, b\_1, b\_2$ are cropped, $b\_5$ is deleted, an additional bit $a\_0$ is inserted between $b\_8$ and $b\_9$, $b\_10$ is substituted by $a\_1$.

As such, what is needed is a robust synchronization scheme for digital content that overcomes IDS degradations.

SUMMARY OF THE INVENTION

The present invention addresses the deficiencies of the prior art by advantageously providing a method, apparatus and system for temporal synchronization of received digital content, such as audio and video watermarked content, to enable robust encoding and decoding of the digital content.

In one embodiment of the present invention, a method for temporal synchronization of digital content includes determining at least one marker symbol and a corresponding marker code such that when the digital content is coded using the marker code, the marker symbol is not repeated by the coded digital content, embedding the determined marker symbol in an identifiable location in a payload of the digital content and coding the payload of the digital content using the determined marker code to form a periodic sequence. The coded digital content can be temporally synchronized for decoding by identifying the marker symbol in the payload of the digital content, the marker symbol marking an identifiable location in the payload for use in decoding the payload of the digital content.

In an alternate embodiment of the present invention, a method for temporal synchronization of digital content includes receiving digital content having an embedded, unique marker symbol in a payload of the digital content, the digital content having been coded via a marker code to form a periodic sequence, temporally synchronizing the digital content for decoding by identifying the marker symbol in the payload of the digital content, the marker symbol marking an identifiable location in the payload for use in decoding the payload of the digital content, and decoding the payload of the digital content using at least a location of the identified marker symbol and the marker code.

In an alternate embodiment of the present invention, an apparatus for temporal synchronization of digital content for use in encoding the digital content includes a marker generation/coding unit configured to determine at least one marker symbol and a corresponding marker code such that when the digital content is coded using the marker code, the marker symbol is not repeated by the coded digital content, to embed the determined marker symbol in an identifiable location in a payload of the digital content, and to code the payload of the digital content using the determined marker code to form a periodic sequence.

In an alternate embodiment of the present invention, an apparatus for temporal synchronization of digital content for use in encoding the digital content includes a marker decoding unit configured to receive digital content having an embedded, unique marker symbol in a payload of the digital content, the digital content having been coded via a marker code to form a periodic sequence, to temporally synchronize the digital content for decoding by identifying the marker symbol in the payload of the digital content, the marker symbol marking an identifiable location in the payload for use in decoding the payload of the digital content, and to decoding the payload of the digital content using at least a location of the identified marker symbol and the marker code.

In an alternate embodiment of the present invention a system for temporal synchronization of digital content includes a marker generation/coding unit and a marker decoding unit. The marker generation/coding unit is configured to determine at least one marker symbol and a corresponding marker code such that when the digital content is coded using the marker code, the marker symbol is not repeated by the coded digital content, to embed the determined marker symbol in an identifiable location in a payload of the digital content, and to code the payload of the digital content using the determined marker code to form a periodic sequence. The marker decoding unit is configure to receive digital content having an embedded, unique marker symbol in a payload of the digital content, the digital content having been coded via a marker code to form a periodic sequence, to temporally synchronize the digital content for decoding by identifying the marker symbol in the payload of the digital content, the marker symbol marking an identifiable location in the payload for use in decoding the payload of the digital content, and to decoding the payload of the digital content using at least a location of the identified marker symbol and the marker code.

BRIEF DESCRIPTION OF THE DRAWINGS

The teachings of the present invention can be readily understood by considering the following detailed description in conjunction with the accompanying drawings, in which.

Figure 1:
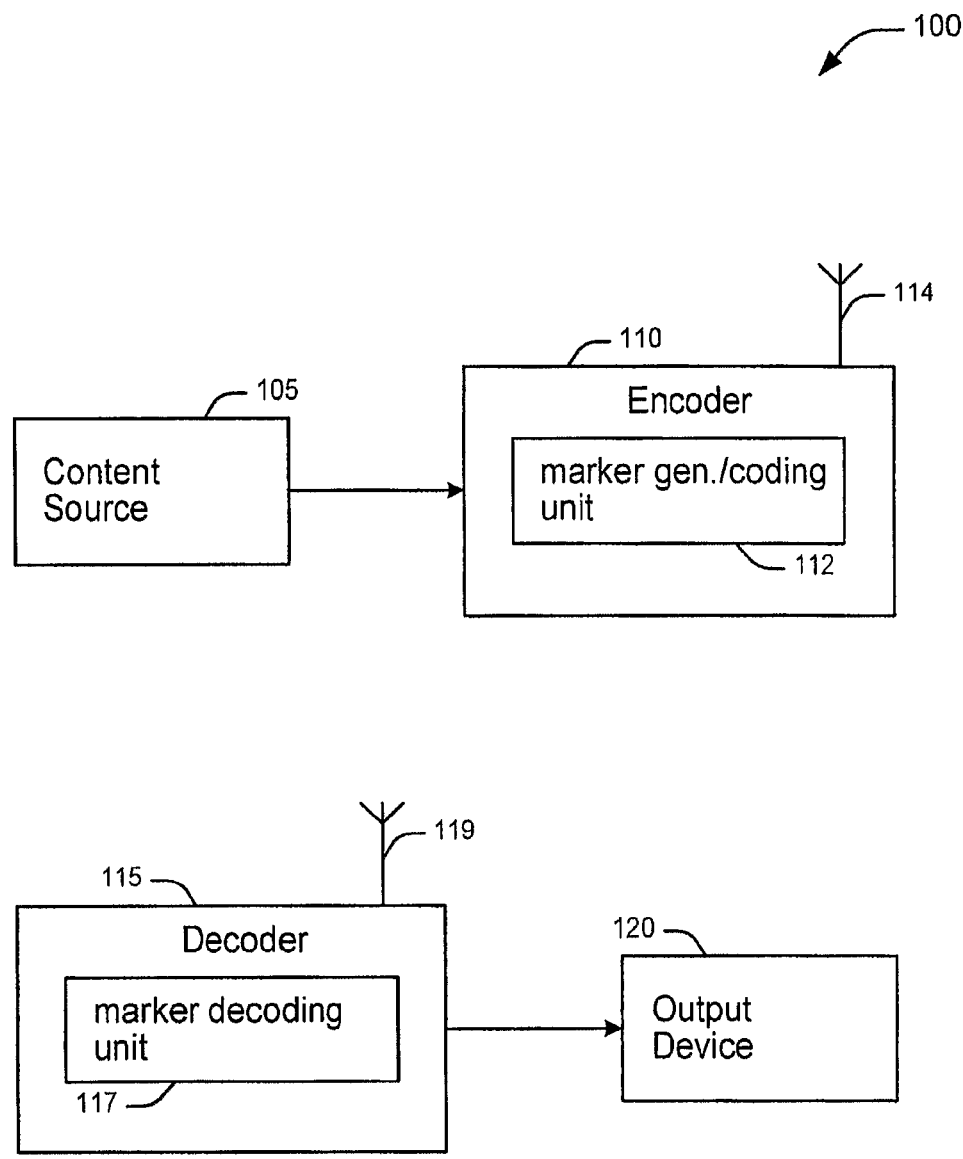
FIG. 1 depicts a high level block diagram of a system for encoding and decoding received content including temporal synchronization in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method, apparatus and system for temporal synchronization of received digital content, such as audio and video watermarked content, to enable robust encoding and decoding. Although the present invention will be described primarily within the context of a stand alone recovery assisted method having an embedded marker symbol and marker code on the payload of watermarked content and being marker coded and decoded by a respective, encoder and decoder, the specific embodiments of the present invention should not be treated as limiting the scope of the invention. It will be appreciated by those skilled in the art and informed by the teachings of the present invention that the concepts of the present invention can be advantageously applied using other special structures transmitted with or embedded in the payload and can be marker coded and decoded in stand alone devices. In addition the concepts of the present invention can be jointly used with other synchronization methods, such as the embedding of a synchronization signal or the combination with a feature based watermarking method.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or hot such computer or processor is explicitly shown.

In temporal synchronization, two important issues arise. A first involves the identification of a specific location in the digital content (e.g., the beginning and/or the end of a watermark sequence). A second issue involves how robust the marking and location identification is against insertions, deletions, and substitutions (IDS). As a digital content (such as a video frame or a block of audio samples) is subject to data insertion, deletion, and/or substitution, robustness against IDS is crucial for payload decoding.

A temporal synchronization method, apparatus and system is described in accordance with various embodiments of the present invention. The described method, apparatus and system include a special structure imposed on the payload in accordance with an embodiment of the present invention. For example, in one embodiment of the present invention, a marker code represents the payload such that automatic re-synchronization in a decoding process can be accomplished. The methods of the embodiments of the present invention can be jointly used with other synchronization methods, such as an embedded synchronization signal or combination with a feature based watermarking method.

FIG. 1 depicts a high level block diagram of a system for encoding and decoding received digital content including temporal synchronization in accordance with an embodiment of the present invention. The system 100 of FIG. 1 illustratively comprises a digital content source 105 (e.g., a digital camera), an encoder 110, a decoder 115 and an output device 120. The encoder 110 of FIG. 1 comprises a marker generation/coding unit 112 and a transmitting device (e.g., a transmitting antenna) 114. The decoder 115 of FIG. 1 comprises a marker decoding unit 117 and a receiving device (e.g., a receiving antenna) 119.

In the system 100 of FIG. 1, the encoder 110 receives the digital content from the digital content source 105. In accordance with an embodiment of the present invention, marker generation/coding unit 112 determines a unique marker symbol and inserts the marker symbol at regular intervals in the received digital content (the payload). At the decoder 115, by searching for special marker symbols, the decoder will be able to identify the location of the marker symbol in the payload (i.e., the beginning or the end of one complete interval of the payload) and as such properly decode the content by, for example, aligning the marker symbols. In one embodiment of the present invention, a system of the present invention can include watermark embedding. It should be noted however, that even with a watermark embedder inserting marker symbols at regular intervals, the watermark decoder could still have difficulty identifying one complete payload interval due to IDS.

More specifically, in a non-watermarking data synchronization application, it can be assumed that the data block length is unchanged from encoding to decoding. In such a scenario, a marker symbol of the present invention would be searched for in the content at known locations for use in temporal synchronization of the encoded and to be decoded content. That is, if two such marker symbols are found within a distance equal to a content interval (e.g., the data block length), then the data can be synchronized to align to the two marker symbols.

On the other hand, in a digital watermarking application and the like, some payload bits could be lost and/or some non-payload bits could be added because of IDS; that is a host signal can be distorted. Thus, it could not be assumed the data block length is constant any more. In addition, it is possible that the marker symbol is identical to a portion of the payload, which adds another ambiguity. As such and in accordance with embodiments of the present invention, to make a marker coding of the present invention more robust and work for watermark synchronization and the like, further coding of the payload bits is herein proposed, in additional to the insertion of a special marker symbol. In various embodiments of the present invention, the proposed marker coding method is applied during payload generation. In contrast, most current synchronization methods are applied after payload generation. For example, geometrically invariant transform based methods and feature based methods are applied during watermark embedding, exhaustive search methods are applied at the detection stage, and synchronization or autocorrelation methods are applied after payload generation. It should be noted however, that embodiments of the present invention can be combined with other synchronization methods such as those described above. That is, the embodiments of the methods of the present invention work at the inner layer (payload generation) of a digital watermarking system, and provide an additional layer of robustness for temporal synchronization.

Referring back to FIG. 1, in one embodiment of the present invention, the marker generation/coding unit 112 in addition to determining a unique marker symbol, also performs marker coding. More specifically in one embodiment of the present invention, a k-bits binary number is selected (for example, it could be all zeros 0 0 . . . 0) as the marker symbol, and is inserted at an identified position in the payload, p (i.e., at the beginning or the end of the payload). Subsequently, selected code words for marker coding are used such that the marker symbol is not repeated, in the payload. Even further, code words can be selected such that specific code words that would result in payload bits somewhat resembling the marker symbol are not used for marker coding the payload. For example, in one embodiment of the present invention, m reserved k-bits binary numbers are selected such that the m selected code words will not be used for encoding the payload. A reason for using code words that will not be used for encoding the payload is to increase the robustness of temporal synchronization from the marker symbol of the present invention.

For example, in one embodiment of the present invention, the number m is ranging from 0 to $(2^k-3)$. For a given m, a closed form procedure for determining the reserved code words can be derived. For the remaining $(2^k-m-1)$ code words, where each is k-bits long, they are used to represent the payload, p, for example, to convert p from its binary representation to a new representation whose base is $(2^k-m-1)$ and whose code words are k-bits long. For example, for the two extreme cases: when m=0, there is no reserved code word, every code word except the marker symbol will be used for marker coding; when $m=2^k-3$, only two code words are left for payload representation, thus every bit of the payload will be represented by a k-bits code word. After the payload representation, error correction encoding can be applied and then repeated embedding can be applied in the digital content.

To easily identify the marker symbol and to maximize the minimum distance between code words and marker symbol (i.e., Hamming distance or other distance measure, depending on the decoder being used), a marker symbol can be selected such that any combination of the $(2^k-m-1)$ code words will be different from the marker symbol, as seen in the following example.

The marker code can be illustrated with a simple example. In this example, k=3 and 0 0 0 is chosen as the marker symbol. Three code words 1 0 0, 0 1 0, and 0 0 1, where each is different from the marker symbol 0 0 0 by only one bit, are reserved and not used for encoding the payload to maximize robustness. As there are four possible code words (0 1 1, 1 0 1, 1 1 0, and 1 1 1) left, the payload, p, can be represented in a base four (4) representation system using these four code words. As such, every two bits in the payload, p, can be mapped into one of the four code words 0 1 1, 1 0 1, 1 1 0, and 1 1 1.

For example, the following code can be defined as follows:
0 0→0 1 1
0 1→1 0 1
1 0→1 1 0
1 1→1 1 1
where the left side depicts 2-bits from the payload, p, and the right side depicts the corresponding 3-bit code word. With the marker symbol 0 0 0 at the beginning, the payload after marker coding will have (3N/2+3) bits. These (3N/2+3) bits will be further error correction encoded and repeatedly embedded into the digital content.

A special property of the above marker code example is that there is at most one "0" in each of the four code words 0 1 1, 1 0 1, 1 1 0, and 1 1 1. As a consequence, there will be no three consecutive "0" in the marker code of a payload, except the marker symbol 000 at, for example, the beginning of a payload.

The marker coded content having the embedded marker symbol is then communicated via the transmitting device 114 to the decoder 115 and received by the decoder 115 via the receiving device 119. The marker decoding unit 117 in the decoder 115 examines the received content for the marker symbol. That is, if the marker decoding unit 117 identifies the marker symbol (e.g., three consecutive "0") in a marker code of a repeatedly embedded payload, it will immediately determine with high confidence that it has found an identifiable location (e.g., the beginning) of a payload. As such, the present invention enables the easy identification of a specific location of the payload (i.e., the beginning or end of a payload) and a location for the re-synchronization of the payload during, for example, decoding.

With respect to decoding, take for example a 16-bits payload 0 1 0 1 0 0 1 1 0 1 1 0 1 0 1 1. A corresponding marker code in accordance with an embodiment of the present invention can be 0 0 0 1 0 1 1 0 1 0 1 1 1 1 1 0 1 1 1 0 1 1 0 1 1 1, where the first three bits "000" is the marker symbol, the next three bits "101" is the marker code of the bits 1 and 2 ("01" of the payload), the next, three bits "101" is the marker code of the bits 3 and 4 ("01" of the payload), etc. This 27-bits marker code can be error correction coded and repeatedly embedded into the digital content at the encoder side. At the decoder side, after, for example, extraction and error correction decoding, the marker decoding unit 117 examines the marker code for three consecutive "0". When three consecutive "0" are located, the marker decoding unit 117 determines a location for temporal synchronization of the payload sequence. The marker symbol location and the marker code can then be used to decode the digital content. The decoded digital content can then be communicated to the output device 120.

It should be noted, however, that because of IDS or other signal processing operations on the watermarked, content, instances can occur when there are no three consecutive "0" in the decoded sequence. In accordance with the present invention, a maximum likelihood principle can be applied by the marker decoding unit 117, to determine which payload sequence is most likely the marker symbol embedded in the content. More specifically and referring to the example above, because in the above described embodiment of the present invention, only five code words, "000", "011", "101", "110", and "111", are used in the encoder, a maximum likelihood principle can be applied to the marker coded digital content to determine which payload sequence is most likely the marker symbol embedded in the content.

Figure 2:
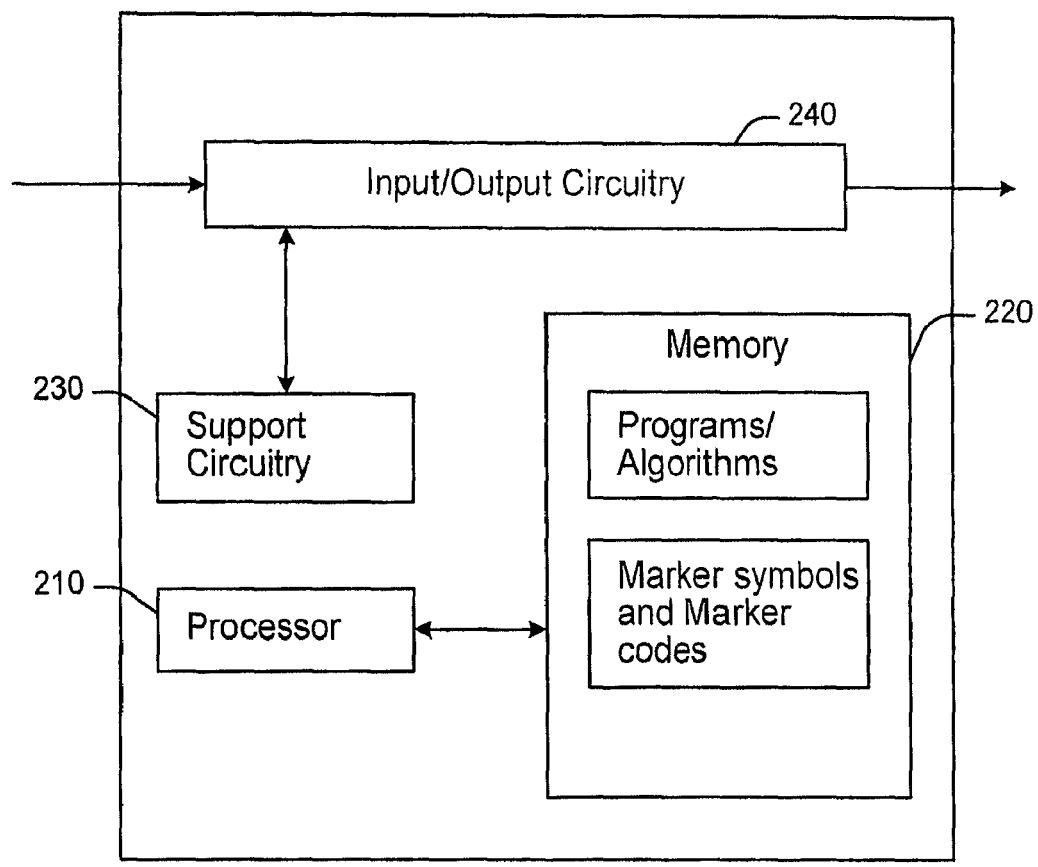
FIG. 2 depicts a high level block diagram of an embodiment of a marker unit suitable for use as a marker generation/encoding unit and/or a marker decoding unit in the encoding and decoding system of FIG. 1.

Although in FIG. 1, the marker generation/coding unit 112 and the marker decoding unit 117 are depicted as being integrated in the encoder 110 and the decoder 115, respectively, in alternate embodiments of the present invention, the marker generation/coding unit 112 and the marker decoding unit 117 of the present invention can be stand-alone units for implementing the aspects of the present invention. For example, FIG. 2 depicts a high level block diagram of an embodiment of a marker unit suitable for use as a marker generation/encoding unit 112 and/or a marker decoding unit 117 in the encoding and decoding system 100 of FIG. 1 in accordance with the present invention. The marker unit of FIG. 2 comprises a processor 210 as well as a memory 220 for storing control programs, algorithms, marker symbols and marker codes and the like. The processor 210 cooperates with conventional support circuitry 230 such as power supplies, clock, circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The marker unit also contains input-output circuitry 240 that forms an interface between the various respective functional elements communicating with the marker unit.

Although the marker unit of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software; hardware, or a combination thereof.

Figure 3:
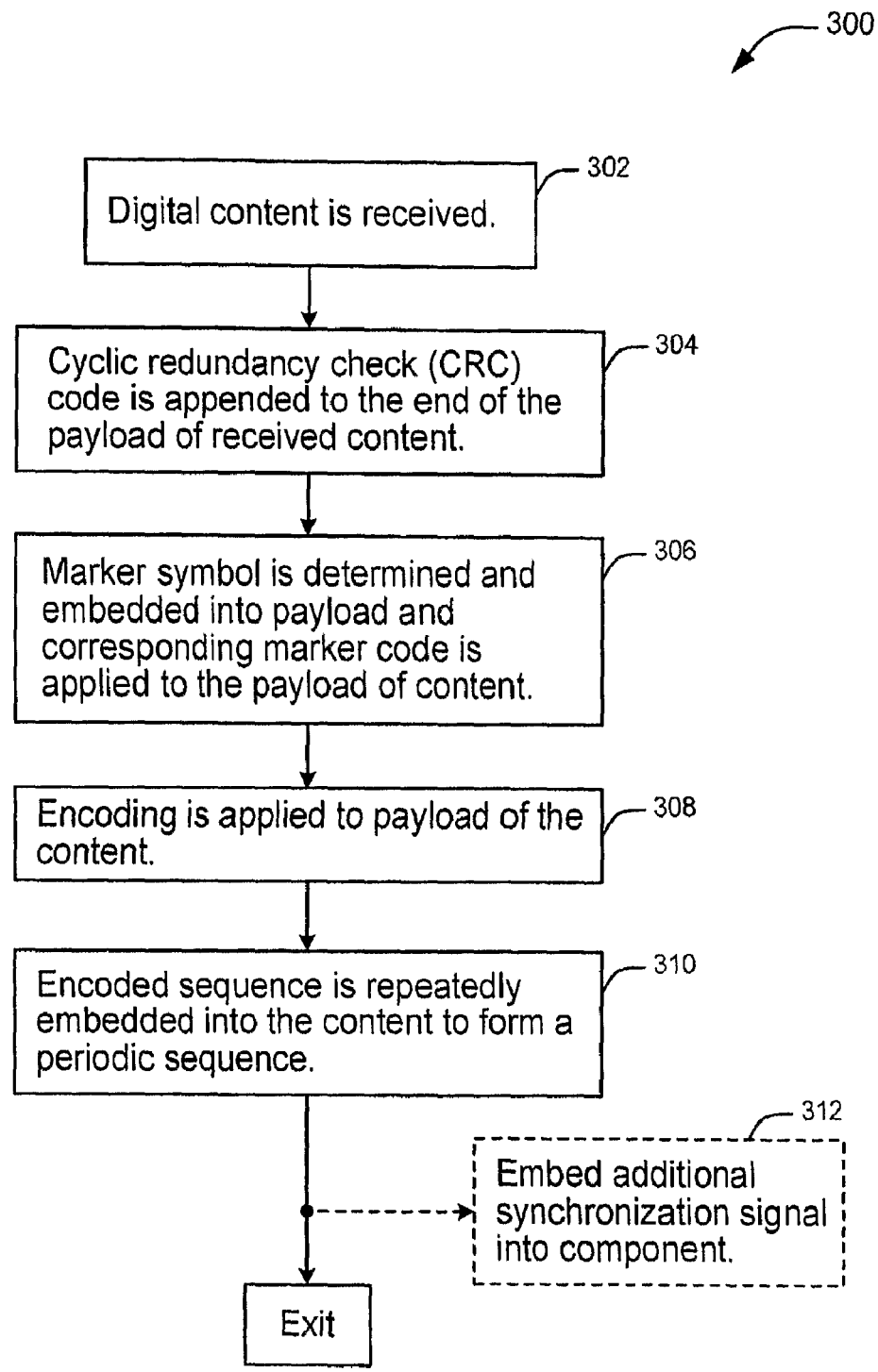
FIG. 3 depicts a high level block diagram of a method of an encoder in accordance with an embodiment of the present invention.

FIG. 3 depicts a high level block diagram of a method of an encoder in accordance with an embodiment of the present invention. With reference to FIG. 3, a watermark payload having 64-bits is assumed. The payload of FIG. 3 could go through a lossless compression first and encryption next, though the compression and/or encryption steps could be omitted in some cases. The method 300 of FIG. 3 begins at step 302 in which digital content (e.g., a 64-bit payload) is received by, for example, a marker generation/coding unit of an encoder for marker coding in accordance with the present invention. The method 300 then proceeds to step 304.

At step 304, a 6-bit cyclic redundancy check (CRC) code is appended to the end of the payload, which increases the payload length to 70-bits. The method 300 then proceeds to step 306.

At step 306, a marker symbol is determined and embedded into the payload and a corresponding marker code is applied to the payload to derive a new sequence of 3*70/2+3, which results in a payload of 108-bits. That is, as described above 0 0 0 can be selected as the marker symbol and in one example inserted into the beginning of the payload, and every two bits of the payload can be coded into one of the code words 0 1 1, 1 0 1, 1 1 0, and 1 1 1. As described above, in various embodiments of the present invention, the marker symbol and marker code are determined such that the code words will be different from the marker symbol such that the marker symbol will not be repeated in marker encoded content. The method 300 then proceeds to step 308.

At step 308, a rate ½ convolutional encoding is applied to the 108-bits sequence to obtain a binary sequence of 216-bits. The method 300 then proceeds to step 310.

At step 310, the 216-bits sequence is repeatedly embedded into the content, for example a video sequence, where each frame represents one bit information of the 216-bit sequence. Various known embedding techniques can be applied and as such the invention should not be limited to any specific embedding method. Thus, for a three-minute video sequence with a frame rate of 24 frames per second, the embedding will be repeated 3*60*24/216, which results in an embedding of 20 times, assuming no additional synchronization signal. The encoding method 300 can then be exited or can optionally proceed to step 312.

At step 312, an additional synchronization signal can be optionally embedded to further enhance the robustness of the synchronization of the present invention.

Figure 4:
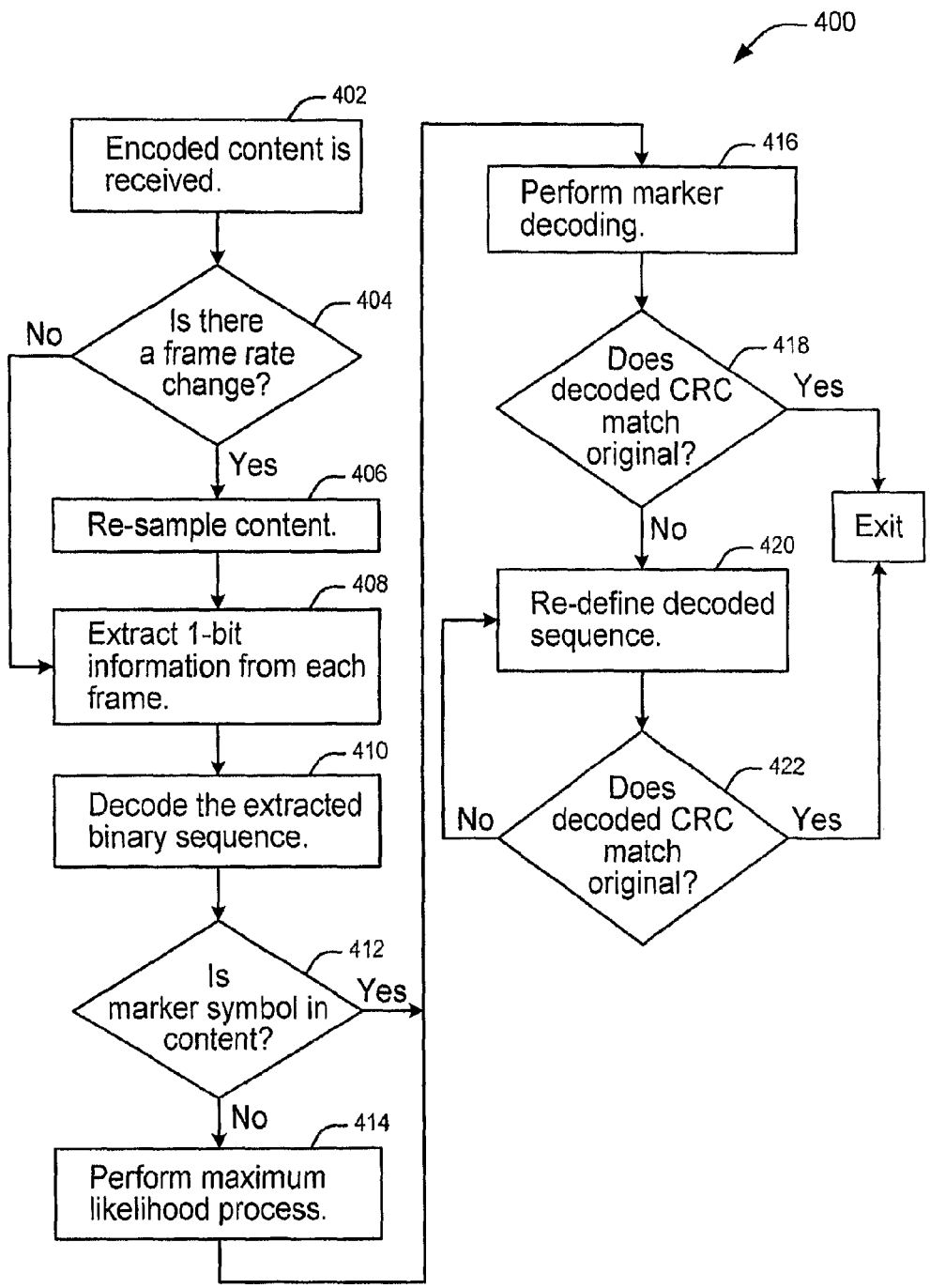
FIG. 4 depicts a high level block diagram of a method of a decoder in accordance with an embodiment of the present invention.

FIG. 4 depicts a high level block diagram of a method 400 of a decoder in accordance with an embodiment of the present invention. The method 400 of FIG. 4 begins at step 402 in which content encoded in accordance with embodiments of the present invention (i.e., the coding of the method of FIG. 3) is received by, for example a marker decoding unit of a decoder of the present invention. The method 400 proceeds to step 404.

At step 404, if there is a frame rate change, the method proceeds to step 406 in which the content is re-sampled. The method then proceeds to step 408. If there is no frame rate change, the method 400 proceeds to step 408.

At step 408, 1-bit information is extracted from each frame. The method 400 then proceeds to step 410.

At step 410, the extracted binary sequence is decoded. If there is no distortion from the encoding to the decoding path, the decoded sequence will be a 20 times repeated 108-bit sequence. However, due to cropping, frame addition or deletion, and/or other signal processing operations or malicious attacks, the decoded sequence can be different from error-free repeated 108-bit sequence. After decoding, the method 400 proceeds to step 412.

At step 412, the decoded content is examined for the marker symbol (e.g., three consecutive zeroes (0 0 0)). If the marker symbol is located, the method 400 skips to step 416. If the marker symbol is not located, the method 400 proceeds to step 414, in which a maximum likelihood process is performed to determine which payload sequence is most likely the marker symbol embedded in the content. The method 400 then proceeds to step 416.

At step 416, the content undergoes marker decoding. That is, because a known position in the content is identified by the marker symbol (i.e., the beginning of the content is identified and as such temporal synchronization is achieved) the content can undergo marker decoding using a reverse process of the marker coding described above. The method 400 then proceeds to step 418.

At step 418, the marker decoded content is examined to determine if the 6-bits after the next 64-bits matches the embedded CRC. If the embedded CRC is verified then it can be assumed that the payload has been correctly decoded and the method is exited. If the CRC does not match for all the cases where the marker symbol is found, then, in one embodiment of the present invention, the method 400 can proceed one step further to step 420.

At step 420, payload bits preceding the marker symbol and payload bits after the marker symbol are collected (i.e., the payload sequence is redefined). For example, the last 20-bits from a previous payload sequence and the first 44-bits from a current payload sequence can be collected. The method then proceeds to step 422.

At step 422, if the CRC of this new 64-bit sequence matches the embedded CRC, then the payload has been correctly decoded and the method 400 is exited. If new 64-bit sequence does not match the embedded CRC, the method 400 can return to step 420. The method 400 of the present invention can perform various iterations of step 420 in an attempt to determine a payload sequence that can be correctly decoded.

Although the methods above are described with reference to an encoder and a decoder, the inventive aspects of the present invention are not so limited. The marker symbol selection, marker code selection, marker code encoding and the marker code decoding of the present invention can be implemented in stand alone devices not included in an encoder and decoder. As such a stand alone marker generation/coding device in accordance with one embodiment of the present invention can perform a method including determining at least one marker symbol and a corresponding marker code such that when the digital content is coded using the marker code, the marker symbol is not repeated by the coded digital content, embedding the determined marker symbol in an identifiable location in a payload of the digital content, and marker coding the payload of the digital content using the determined marker code to form a periodic sequence as described above. That is, when a stand alone marker generation/coding device in accordance with one embodiment of the present invention is applied, not all of the method steps of, for example, the method 300 of FIG. 3 are performed in the stand alone marker generation/coding device. Instead, the traditional encoding steps will be performed in an associated encoder.

Similarly, a stand alone marker code decoding device in accordance with one embodiment of the present invention can perform a method including receiving digital content having an embedded, unique marker symbol in a payload of the digital content, the digital content having been encoded via a marker code to form a periodic sequence, temporally synchronizing the digital content for decoding by identifying the marker symbol in the payload of the digital content, the marker symbol marking an identifiable location in the payload for use in decoding the payload of the digital content, and decoding the payload of the digital content using at least a location of the identified marker symbol and the marker code as described above. That is, when a stand alone marker code decoding device in accordance with one embodiment of the present invention is applied, not all of the method steps of, for example, the method 400 of FIG. 4 are performed in the stand alone marker code decoding device. Instead, the traditional decoding steps will be performed in an associated decoder.

Having described various embodiments for a method, apparatus and system for temporal synchronization of digital content based on, for example, a unique marker symbol and corresponding marker code (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A method for temporal synchronization of digital content, comprising:
    determining at least one marker symbol and a corresponding marker code such that when said digital content is coded using said marker code, said marker symbol is not repeated by said coded digital content;
    embedding said determined marker symbol in an identifiable location in a payload of said digital content; and
    coding the payload of said digital content using said determined marker code to form a periodic sequence;
    wherein the payload of said digital content is temporally synchronized for decoding by identifying said marker symbol in the payload of said digital content, said marker symbol marking an identifiable location in the payload for use in decoding said payload of said digital content.

2. The method of claim 1, further comprising error correction coding said digital content.

3. The method of claim 1, wherein said marker symbol is embedded in said digital content at a regular interval.

4. The method of claim 3, wherein said regular interval comprises a payload interval.

5. The method of claim 1, wherein marker code words of said marker code are selected such that marker code words that result in payload bits resembling the marker symbol are not used for marker coding the payload of the digital content.

6. The method of claim 1, further comprising embedding an additional synchronization signal into the payload of said digital content.

7. The method of claim 1, further comprising encoding said coded digital content for transmission to a decoding device.

8. The method of claim 1, further comprising appending a CRC code to the payload of said digital content.

9. A method for temporal synchronization of digital content, comprising:
    receiving digital content having an embedded, unique marker symbol in a payload of said digital content, said digital content having been coded via a marker code to form a periodic sequence,
    temporally synchronizing said digital content for decoding by identifying said marker symbol in the payload of said digital content, said marker symbol marking an identifiable location in the payload for use in decoding said payload of said digital content; and
    decoding the payload of said digital content using at least a location of said identified marker symbol and said marker code;
    wherein said received marker coded digital content further undergoes extraction and error correction decoding.

10. The method of claim 9, wherein in response to a marker symbol in the payload of said digital content not being identified, a maximum likelihood principle is applied to the payload of said digital content to determine which payload sequence is most likely the marker symbol embedded in the content.

11. The method of claim 9, further comprising examining a cyclic redundancy check (CRC) code appended to the payload of said digital content to determine if said digital content has been properly decoded.

12. The method of claim 11, wherein if an examined CRC code does not match a CRC code appended to the payload of said digital content during an encoding process, payload bits surrounding an identified marker symbol are regrouped in an attempt to locate and identify said appended CRC code in said digital content.

13. An apparatus for temporal synchronization of digital content for use in encoding said digital content, comprising:
   a marker generation/coding unit configured to:
      determine at least one marker symbol and a corresponding marker code such that when said digital content is coded using said marker code, said marker symbol is not repeated by said coded digital content;
      embed said determined marker symbol in an identifiable location in a payload of said digital content; and
      code the payload of said digital content using said determined marker code to form a periodic sequence.

14. The apparatus of claim 13, wherein said apparatus comprises an encoder.

15. The apparatus of claim 13, wherein said marker symbol and corresponding marker code are used in watermarking audio and/or video digital content 16. The apparatus of claim 13, further comprising a transmitter for communicating said coded digital content to a decoding device.

17. A system for temporal synchronization of digital content, comprising:
   a marker generation/coding unit configured to:
      determine at least one marker symbol and a corresponding marker code such that when said digital content Is coded using said marker code, said marker symbol is not repeated by said coded digital content;
      embed said determined marker symbol in an identifiable location in a payload of said digital content; and
      code the payload of said digital content using said determined marker code to form a periodic sequence; and
   a marker decoding unit configured to:
      receive digital content having an embedded, unique marker symbol in a payload of said digital content, said digital content having been coded via a marker code to form a periodic sequence,
      temporally synchronize said digital content for decoding by identifying said marker symbol in the payload of said digital content, said marker symbol marking an identifiable location in the payload for use in decoding said payload of said digital content; and
      decoding the payload of said digital content using at least a location of said identified marker symbol and said marker code.

18. The system of claim 17, further comprising an output device for presenting said decoded digital content.

* * * * *